United States Patent
Naffziger et al.

(10) Patent No.: US 7,533,285 B2
(45) Date of Patent: May 12, 2009

(54) SYNCHRONIZING LINK DELAY MEASUREMENT OVER SERIAL LINKS

(75) Inventors: Samuel D. Naffziger, Fort Collins, CO (US); Eric M. Rentschler, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 10/830,375

(22) Filed: Apr. 22, 2004

(65) Prior Publication Data

US 2005/0238127 A1    Oct. 27, 2005

(51) Int. Cl.
G06F 1/04       (2006.01)
H04L 7/00       (2006.01)

(52) U.S. Cl. .............. 713/500; 713/501; 713/502; 713/503; 370/304; 370/324

(58) Field of Classification Search ............ 713/500, 713/501, 502, 503; 370/304, 324
See application file for complete search history.

(56) References Cited

U.S. PATENT DOCUMENTS

| | | | |
|---|---|---|---|
| 3,715,679 A | | 2/1973 | Fleischer |
| 5,216,717 A | * | 6/1993 | Bourcet et al. ............ 381/3 |
| 5,473,638 A | * | 12/1995 | Marchetto et al. ......... 375/356 |
| 5,719,862 A | * | 2/1998 | Lee et al. ................. 370/355 |
| 6,031,847 A | * | 2/2000 | Collins et al. ............ 370/508 |
| 6,326,824 B1 | * | 12/2001 | Hosoe et al. ............. 327/160 |
| 6,536,025 B2 | | 3/2003 | Kennedy et al. |
| 6,851,009 B1 | | 2/2005 | Regula |
| 7,154,850 B1 | * | 12/2006 | Cloutier et al. ........... 370/230 |
| 2004/0081246 A1 | | 4/2004 | Bazes |

OTHER PUBLICATIONS

US Patent Office: Office Action mailed Nov. 22, 2005; U.S. Appl. No. 10/830,367.
US Patent Office: Office Action mailed Mar. 20, 2006; U.S. Appl. No. 10/830,367.
US Patent Office: Office Action mailed Aug. 1, 2006; U.S. Appl. No. 10/830,367.
US Patent Office: Notice of Allowance and Fees Due mailed Oct. 20, 2006; U.S. Appl. No. 10/830,367.
US Patent Office: Office Action mailed Jan. 23, 2007; U.S. Appl. No. 10/830,367.
US Patent Office: Notice of Allowance and Fees Due mailed May 31, 2007; U.S. Appl. No. 10/830,367.

* cited by examiner

*Primary Examiner*—Thomas Lee
*Assistant Examiner*—Michael J Brown

(57) ABSTRACT

Systems, methods, and other embodiments associated with synchronizing link delay is provided. In one example system, a system for synchronizing signal communication between a first electronic component and a second electronic component connected by one or more serial communication links comprises an offset logic configured to apply a selected offset to signal transmissions to cause a unidirectional delay between the first and the second electronic components to be synchronized for both directions of signal transmissions. A synchronization logic is configured to determine the unidirectional delay for signal transmissions between the first and second electronic components and configured to control the offset logic to apply the selected offset.

26 Claims, 11 Drawing Sheets

| Link Length (inches) | Shift Register Depth | | | | |
|---|---|---|---|---|---|
| | $f_{range} = 1.0$ GT/s | $f_{range} = 1.5$ GT/s | $f_{range} = 2.0$ GT/s | $f_{range} = 2.5$ GT/s | $f_{range} = 3.0$ GT/s |
| 5 | 1 | 2 | 2 | 3 | 3 |
| 10 | 2 | 3 | 4 | 5 | 6 |
| 15 | 3 | 5 | 6 | 8 | 9 |
| 20 | 4 | 6 | 8 | 10 | 12 |
| 25 | 5 | 8 | 10 | 12 | 15 |
| 30 | 6 | 9 | 12 | 15 | 17 |
| 35 | 7 | 10 | 14 | 17 | 20 |
| 40 | 8 | 12 | 15 | 19 | 23 | ns
SYNCHRONIZING LINK DELAY MEASUREMENT OVER SERIAL LINKS

BACKGROUND

Computer systems are changing in the way internal components are connected. Internal components may include processors, memory controllers, and I/O controllers. Many systems connect their components with a wide, synchronous multi-drop bus. However, configurations are changing to use high-speed, narrow point-to-point links. One reason for the change is that the multi-drop bus approach is becoming a performance limitation. The point-to-point links approach presents new challenges for chip and system designer such as repeatability for varying clock operating frequencies.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
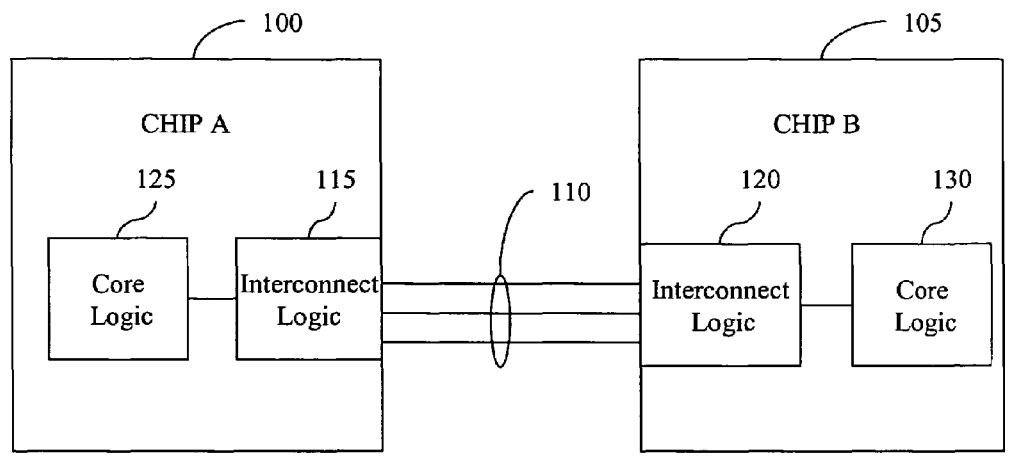
FIG. 1 illustrates an example diagram of two components in communication with each other that can apply a delay offset to communicated signals.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, optical or magnetic disks, dynamic memory and the like. Transmission media may include coaxial cables, copper wire, fiber optic cables, and the like. Transmission media can also take the form of electromagnetic radiation, like those generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store", as used herein, refers to a physical and/or logical entity that can store data. A data store may be one or more of, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic like an application specific integrated circuit (ASIC), a programmed logic device, a memory device containing instructions, or the like. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communication flow, and/or logical communication flow may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic device, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted, and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components and logics of the example systems and methods described herein may include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained and/or transmitted as part of a computer-readable medium as defined previously. Another form of the software may include signals that transmit program code of the software to a recipient over a network or other communication medium. Thus in one example, a computer-readable medium has a form of signals that represent the software/firmware as it is downloaded from a web server to a user. In another example, the computer-readable medium has a form of the software/firmware as it is maintained on the web server. Other forms may also be used. It will be appreciated that all components described herein may be implemented as separate components or may be combined together.

"User", as used herein, includes but is not limited to one or more persons, software, computers or other devices, or combinations of these.

Some portions of the detailed descriptions that follow may be presented in terms of algorithms and symbolic representations of operations on data bits within a memory or other logic. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, instructions, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, applying, displaying, or the like, refer to actions and/or processes of a computer system, logic, processor, circuit, or similar electronic device that can manipulate and transform data represented as physical (electronic) quantities.

Described herein are example systems, methods, and other embodiments associated with designing, manufacturing, testing, and/or debugging of communication configurations and logic devices that have communication link repeatability. For example, in a computing device, internal components can be connected to each other using a variety of data transfer structures like point-to-point links. For purposes of the following examples, the internal components can include, without limitation, processors, memory controllers, input/output (I/O) controllers, logic devices, circuits, and/or any electronic device that can be connected to a communication link such as a bus. Components that are connected by point-to-point links are configured to transmit and receive signals using a selected clock operating frequency or range of operating frequencies. The term "operating frequency" will also be used interchangeably with "transmission frequency," "signal transmission frequency," "link frequency," and the like.

Maintaining link repeatability between components is challenging since the behavior or response of a component may change as the operating frequency changes. Testing and/or debugging systems become more difficult when conditions change. As one explanation, link repeatability is a link feature that fixes the link transfer latency in terms of clock cycles over a range of clock operating frequencies so that the behavior of a component is consistent for a set of stimuli even at different operating frequencies.

In one example system described herein, where two electronic components are in communication with each other, the system may include a de-skew mechanism configured to offset signals received over each communication link in order to re-align bits that are transmitted together so that they are read together. A repeatability logic can also be included that is configured to apply a delay offset (also referred to as a repeatability offset) to the bits received which is based on the operating frequency. If a different operating frequency is used, the repeatability logic can apply a different value for the delay offset such that the behavior or response of a component that receives signals is the same behavior or response that is observed for different operating frequencies or ranges.

As another example, having link repeatability can impact test and debug usage models. In a first model, during silicon debug on test analyzers, various parts of a component under test can be tested by using test vectors generated from pre-silicon validation. The test vectors are used to stimulate the component and its response is observed. Without link repeatability, different sets of test vectors would be required for different link frequencies. In other words, if the link frequency changes, the same test vector would not produce the same behavior or response from a component. Thus, different test vectors would be needed for different link operating frequencies. With the present systems and methods, link repeatability can be achieved and only one set of test vectors could be used over a range of link frequencies. This can represent a savings in test vector development time. It also can make the debug process more straight-forward, providing the ability to see where one particular vector set fails over frequency. Being able to use a single vector set can also reduce manufacturing cost since test vectors are run on wafers to screen parts or components within the manufacturing process.

In the second usage model, during system validation, engineers typically root-cause bugs that are detected. Frequency shmooing is a technique that can be used. In this technique, a test engineer would shmoo (vary) the operating frequency over a range to determine if a bug is related to speed. To enable frequency shmooing, the component under test should behave identically at different frequency points within the frequency range of interest. In some systems, this condition is often not satisfied because input/output (I/O) behaviors of components change as the clock frequency changes.

At some frequency points, where testing would have normally have had to transition from one test vector set to another, there could be frequency ranges that a tester would want to stay away from. For example, there may not be clear pass/fail conditions for the frequency range and it may be difficult to troubleshoot for problems. With the present systems and methods as described below, link repeatability can be achieved such that the behavior of components can be made to be substantially consistent/constant as the clock frequency changes.

The present systems and methods can provide link repeatability that can also be used in building fault-tolerant systems. For example, socket level determinism (e.g. repeatability) is desired to build lock-step systems. Although link repeatability alone does not provide for absolute socket level determinism, it is a factor. Link repeatability can better ensure that two components running at a fixed, even frequency ratio exhibit identical cycle-to-cycle link behaviors.

Illustrated in FIG. 1 is an example block diagram of two electronic components that are connected to one another using one or more communication links. For example, chip A 100 is connected to chip B 105 using one or more point-to-point links 110 that may be high speed serial links. Each chip includes an interconnect logic 115, 120, respectively, that is configured to control signal transmission and/or reception over the point-to-point links 110. Each chip is also shown with a core logic 125, 130, respectively, which generically represents the logic implemented in the chip to perform its designed function(s). The core logic 125, 130 is not important to this discussion and will not be described in further detail.

As a general example, when in the interconnect logic 115 is in a transmission state, the interconnect logic 115 would receive signals from its core logic 125, process the signals into an appropriate communication format if needed, and transmit the signals on the point-to-point links 110 to chip B 105. The interconnect logic 120 would change to a receiving state where it can read the signals from the links 110, process the signals from the communication format to a format for the core logic 130, and provide the signals to its core logic 130. The reverse scenario can also apply.

In one embodiment, the interconnect logic 120, can be configured to apply a delay offset to the signals received where the delay offset is based on the transmission frequencies or clock operating frequencies used. By changing the delay offset, repeatable behavior of a chip or other component can be achieved when the operating frequencies change. In another example, the delay offsets can be based on a selected clock operating frequency range and a link length of the point-to-point links 110 between chip A 100 and chip B 105. In general, the longer the link length, the more difficult it is for the system to tolerate frequency changes and the greater the delay offset may need to be.

Referring to interconnect logic 120 but which can apply to any similar logic described herein, in one example the interconnect logic 120 may include a packet assembler/disassembler (PAD) that is not illustrated. The PAD can be a hardware and/or software device configured to split a data stream(s) into discreet packets for transmission over the links 110 and then reform the data stream(s) at a receiving end. In other words, the PAD can assemble data into packets for transmission and disassembles the packets on arrival so the data can be used by the core logic. By applying a delay offset to the signals received in the interconnect logic 120, the system can cause a total delay between chip A 100 and chip B 105 to be a constant number of clock cycles from the reference point of the core logic 125 or 130. For example, the total delay is the time from when the core logic 125 sends a signal to when the core logic 130 receives the signal. As will be described in greater detail below, the amount of the delay offset can be changed with different selected operating frequency ranges.

In one example configuration, the core logic 125 and/or 130, can include a fixed clock domain that is a synchronous clock domain which may apply to the entire core logic or at least a large portion of the logic. The PAD, however, may include many asynchronous logic components and varying clock domains relative to the core logic clocks. The PAD within the interconnect logic 115, 120, can be configured to abstract out data signals to send/receive data and control the signal delay. In one example, a buffering logic for repeatability (which will be described in greater detail below) can be included in the PAD or other component of the interconnect logic 115, 120 that makes the delay between components constant at least over a range of operating conditions/frequencies.

Figure 2:
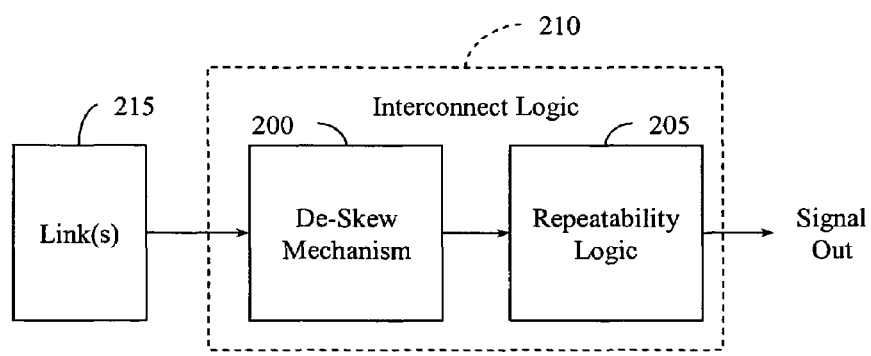
FIG. 2 illustrates an example system diagram of an interconnect logic.

Illustrated in FIG. 2 is an example of a signal processing system that can include a de-skew mechanism 200 and a repeatability logic 205. One or both of these components can be regarded as the buffering logic and can be part of an interconnect logic 210 that is configured to communicate with a link 215. The interconnect logic 210 can be implemented as previously described with reference to interconnect logic 115 or 120. The interconnect logic 210 may include a signal transceiver and any desired logic and/or functionality to process signals with the link 215. In the following example, the de-skew mechanism 200 and the repeatability logic 205 are configured to process signals received from the link 215 and to produce a corresponding signal out. It will be appreciated that the link 215 generally can represent one or more point-to-point links between two electronic components.

With further reference to FIG. 2, as signals are received from the link 215, the de-skew mechanism 200 is configured to apply a bit-to-bit shift to realign the received bits. For example, the de-skew mechanism 200 can include one or more shift registers and may be a multidimensional shift register based on the number of links and the amount of shift desired. To determine an appropriate bit offset for the de-skew mechanism 200, a reset process can be performed (also called links configuration or link layer configuration) during the design and manufacturing of the system to determine how bits are skewed when transmitted over the links 215. For example, a predetermined bit pattern (e.g., a test vector of all "0" bits) can be transmitted from one component to the other and then the bit pattern can be changed to all "1" bits. The transition of the bit values can then be observed at the receiving end and a bit offset value can be determined for each link that is needed to re-align the received bit so that a set of bits that are transmitted together are properly read together by the receiving component. The bit offset value, however, is determined based on certain system conditions which include a certain clock operating frequency. If the operating frequency changes, the bit offset values for the links may also change.

To address frequency changes, the repeatability logic 205 can be configured to provide an additional offset based on the clock operating frequency. For example, the repeatability logic 205 can apply different values for a repeatability offset or delay offset that can be changed based on the operating frequency. The repeatability offset is applied to all links 215 equally so that a total delay between the components is constant or substantially constant.

Figure 3:
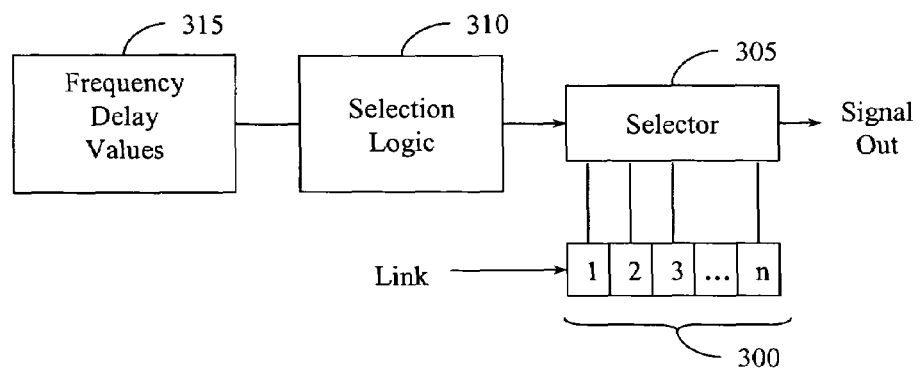
FIG. 3 illustrates one example of a combined bit de-skew and delay offset logic.
Figure 5:
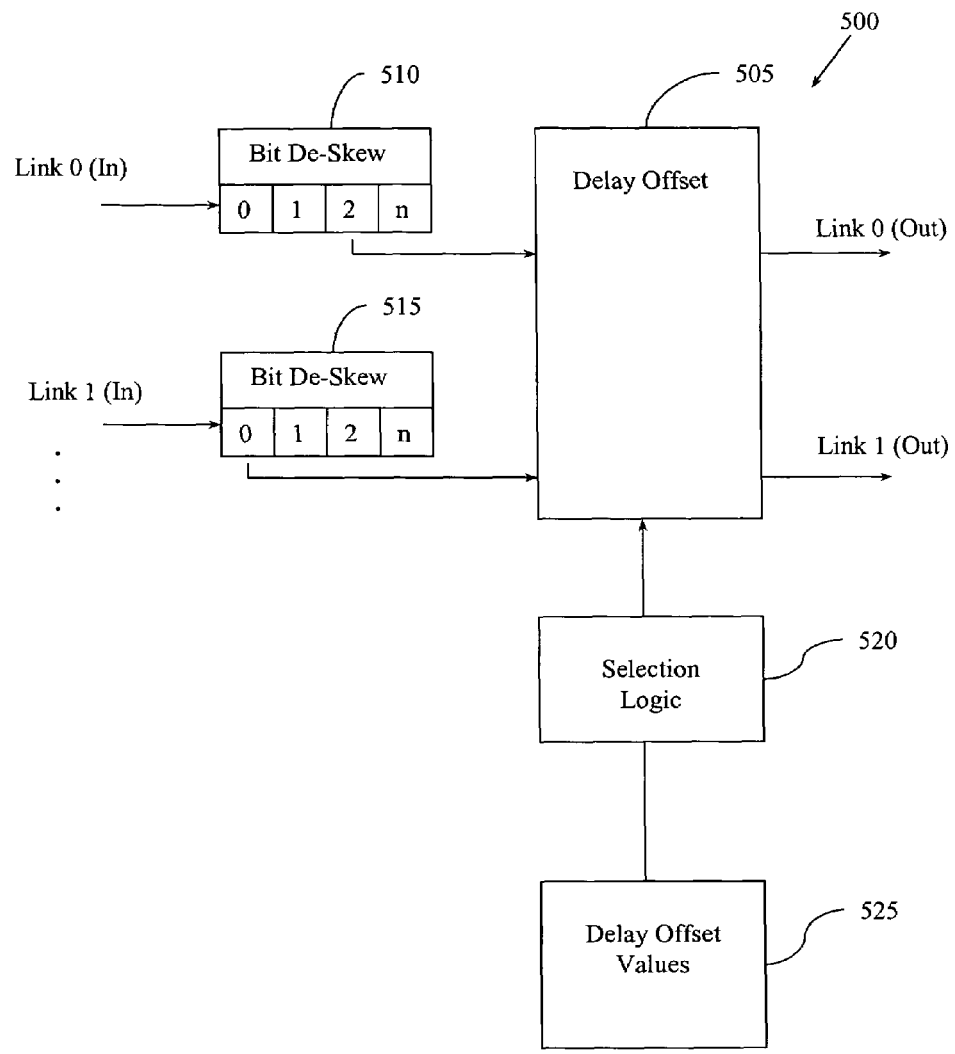
FIG. 5 illustrates one example of separate bit de-skew and frequency logics.

In one implementation, the de-skew mechanism 200 and repeatability logic 205 can be designed as a single shift register that is operably connected to each link. The depth of the shift register can be determined based on the number of bit offsets needed for the de-skew mechanism 200 and a desired range of frequencies for the repeatability logic 205. One example of this implementation is shown in FIG. 3. Another example implementation may include a design where the de-skew mechanism 200 is separate from the repeatability logic 205. One example is illustrated in FIG. 5.

The different values for the repeatability offset can be determined, for example, by running tests on a given system at different operating frequencies to determine how the frequencies affect signal communication. Also, the tests can be performed using different link lengths between the two connected components. In general, as the link length between components increases, a larger shift register may be needed in order to accommodate a greater variety of repeatability offset values for different operating frequency ranges. An example shift register depth table 900 is illustrated in FIG. 9 that shows example frequency ranges, corresponding link lengths in inches, and a corresponding shift register depth that can be used to implement the de-skew mechanism 200 and the repeatability logic 205.

Figures 8, 9:
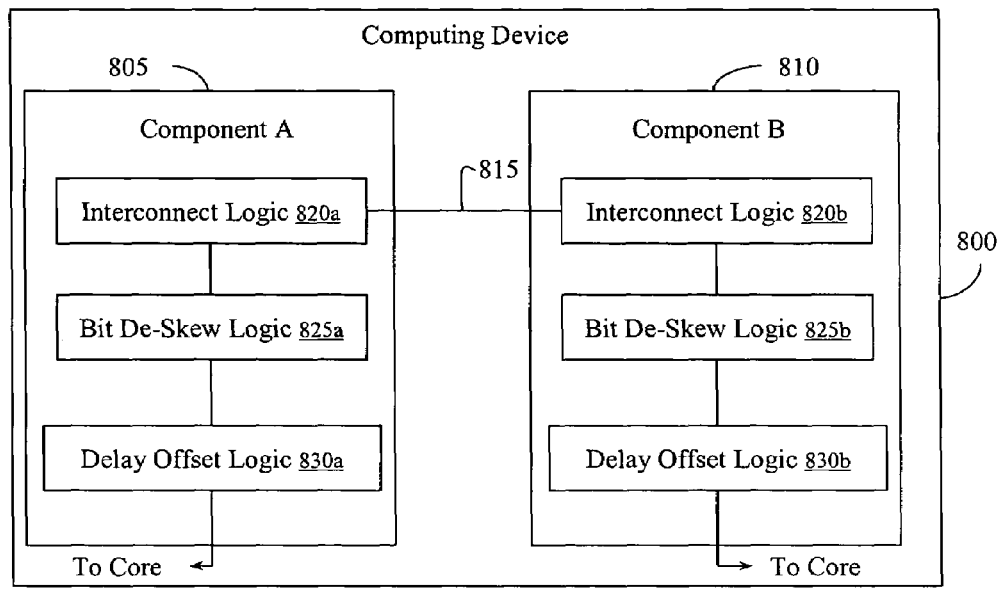
FIG. 8 illustrates one example of a computing device configured with delay offset logic.
FIG. 9 illustrates an example table of shift register depths for different frequency ranges and link lengths.

In the table 900 of FIG. 9, $f_{range}$ represents a frequency range calculated from a difference between a high frequency used to a low frequency used (e.g. $f_{range}=f_{high}-f_{low}$. The term GT/s stands for giga-transfers per second and assume 1/v is approximately 187 pS/inch. Referring to the table and looking at a frequency range of 1.5 GT/s and a link length of 10 inches, a 3-bit deep shift register can be used to provide additional bit offsets for that frequency range. Thus, in one example, if the de-skew mechanism 200 is configured with 8 bits of shift, an 11-bit shift register (8+3) can be used for bit de-skew and delay offset.

It will be appreciated that the shift register can have a varying width based on the number of links. It will also be appreciated that the values shown in FIG. 9 represent only example values and that actual values will be dependent on specific system conditions and/or circuit configurations used. Values for the repeatability offset can be stored in any desired data store such as one or more registers. The values can then be configured to be readable and used to programmatically change the configuration of the repeatability logic 205 to apply different values for the repeatability offset. The repeatability logic 205 can also be selectively enabled and disabled to turn on or off the repeatability offset.

Illustrated in FIG. 3 is one example of a single shift register 300 that can be used to implement both the bit-to-bit de-skew and the repeatability/delay offset for a given communication link. The shift register 300 can have a depth of 0 to n bits, and may be one or more bits wide to accommodate multiple links if desired. In the illustrated example, the shift register 300 is configured for each link. A selector 305 can be configured to tap a selected location from the shift register 300 to read out a bit value which becomes a signal out. The selector 305 can be implemented in any desired type of logic such as a multiplexer. A selection logic 310 can be configured to control the selector 305 by changing the location in the shift register 300 from which to read. By changing the read location (also known as a tap location) a different offset can be applied to bits received over the link. One or more frequency delay values 315 can be maintained, and selectively retrieved by the selection logic 310 to determine the tap location. For example, based on the operating frequency used, a different frequency delay value can be applied to the selector 305. The selection logic 310 can also selectively enable and disable the frequency delay to reduce signal latency if desired.

Figure 4:
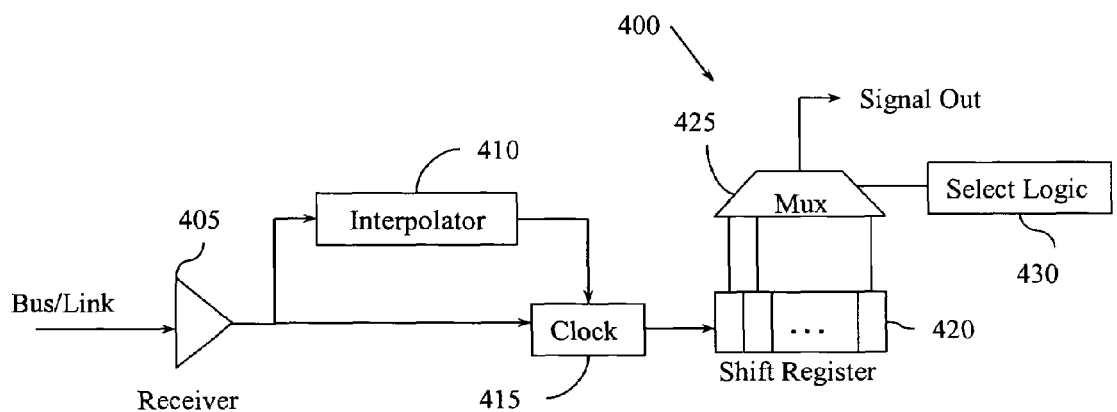
FIG. 4 illustrates another example configuration of FIG. 3.

Illustrated in FIG. 4 is an example of a signal receiving and processing system that can offset signals based on frequency and is a variation of the system in FIG. 3. The system 400 can be implemented in an interconnect logic, a PAD, other logic device for communicating signals with a communication link, or the like. Signals coming from a bus or link can be received by a receiver 405 or other type of buffering logic. With asynchronous communication, the signal can include a data stream that is analyzed by an interpolator 410. The interpolator 410 can be configured to determine the clock cycle based on the data stream and how data corresponds to clock edges. The determined clock cycle can then used to control a clock 415 that clocks the received data to a shift register 420. The shift register 420 is configured to implement the previously described bit-to-bit de-skew mechanism and the repeatability logic to provide both a bit-to-bit offset and a frequency delay offset. A multiplexer 425 is configured to tap a selected location from the shift register 420 in accordance with control signals from a selection logic 430 that can be configured similarly to the selection logic 310 from FIG. 3. From the tap location, a signal out is provided from the multiplexer 425.

Illustrated in FIG. 5 is another example of a repeatability logic 500 that can be configured to apply a delay offset 505 to signals received over one or more links, e.g. link 0, link 1, etc. In this example, the delay offset 505 is configured as a separate component from bit de-skew registers 510 and 515, where a separate bit de-skew register can be used for each link. Of course any number of links and bit de-skew registers can be used. In another example, a multidimensional bit de-skew shift register can be used for multiple links. The bit de-skew can also be implemented in any type of logic desired.

For each link, a selected bit location is tapped out of each bit de-skew register 510, 520 to read out the bit value. Tapping from a different location results in a bit-to-bit de-skew for each link. For example, in bit de-skew register 510, location "2" is being tapped to read the value. The delay offset 505 can then be equally applied to all tapped bit values to provide an additional offset based on frequency. Although the bit de-skew can be a different value for each link, the delay offset 505 is the same value for all links. A corresponding output signal link 0 (out), link 1 (out), is then output for each input link.

A selection logic 520 can be provided to selectively enable and disable the application of the delay offset 505 and to change the value of the delay offset 505 programmatically based on the frequency used. Optionally, one or more delay offset values 525 can be maintained that correspond to selected frequency ranges. For a selected frequency range, the selection logic 525 can apply an appropriate delay offset to ensure repeatability of system behavior as the frequency changes. In one example, the delay offset 505 can be implemented using one or more shift registers or any desired logic that can provide an offset to the signals. As previously described, the delay offset 505 can be set when a circuit or device is being configured. Offset values can be selected from a predetermined table 900 of values as in FIG. 9 which can be determined from tests using different operating frequency ranges and link lengths.

Figure 6:
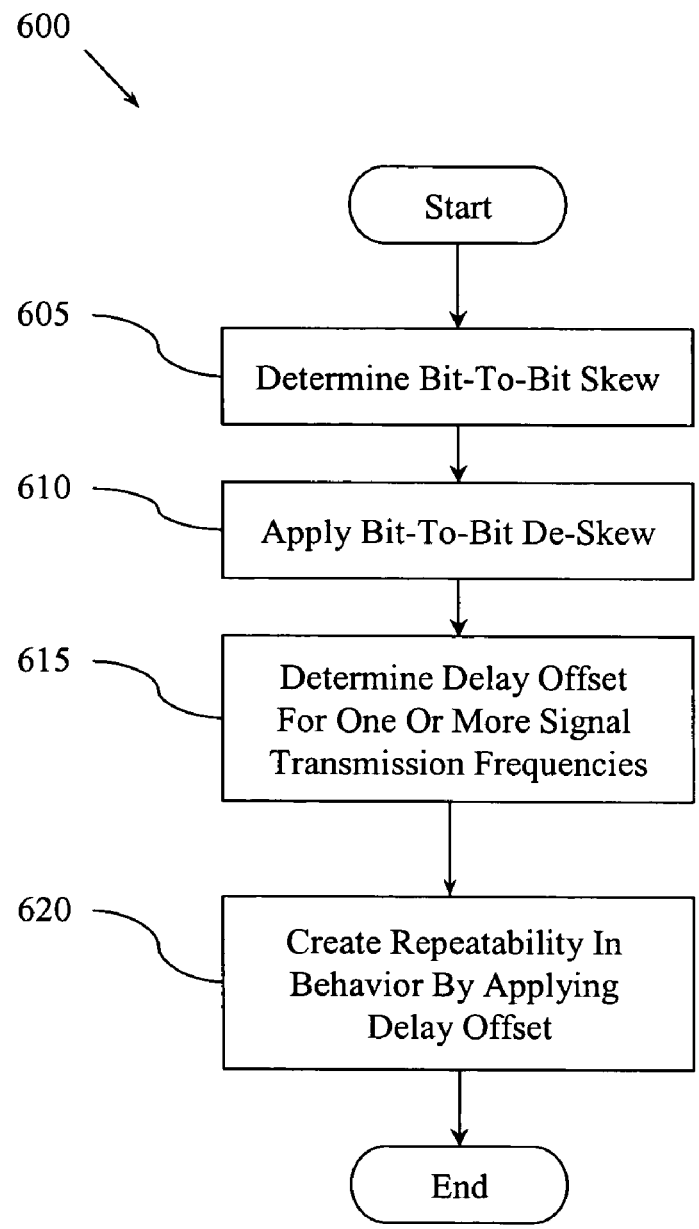
FIG. 6 illustrates an example methodology for designing/configuring a device for communication.

Illustrated in FIG. 6 is one example of a methodology 600 that may be used for testing and/or debugging electronic components in communication by point-to-point links that include any one of the repeatable systems described herein or any combination of the systems. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less or more than all the illustrated blocks may be used to implement an example methodology. Furthermore, additional and/or alternative methodologies can employ additional, not illustrated blocks.

In the flow diagrams, blocks denote "processing blocks" that may be implemented with logic. A flow diagram does not depict syntax for any particular programming language, methodology, or style (e.g., procedural, object-oriented) if applicable to software or firmware implementations. Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, firmware, procedural, object oriented, and/or artificial intelligence techniques. The various actions illustrated and/or described herein can occur in serial, but also various actions could occur substantially in parallel.

It will be appreciated that the methodology 600 and the other methodologies described herein can be embodied as processor-executable instructions provided by a computer-readable medium. For example, processor-executable instructions can be provided that are configured to cause a computing device or other logic to respond and/or behavior in a desired manner.

With reference to FIG. 6, to configure the signal receiving logic of an electronic component, a bit-to-bit skew is determined that may occur over the point-to-point links (Block 605). The skew can be determined, for example, by performing a link layer configuration or reset process as previously described. Once determined, the bit-to-bit de-skew can be applied to each link as needed (Block 610). A frequency shift or offset can be determined for one or more signal transmission (clock) frequencies that are used (Block 615). One example of determining the delay offset can be by using previously obtained data such as from a predetermined table 900 shown in FIG. 9. As previously described, for example, determining the delay offset for a given communication link configuration may be obtained by performing one or more tests over the communication links under a variety of operating conditions such as different clock frequencies and different link lengths between components. The process 600 can create repeatability in behavior by applying the delay offset to the signals received by a component (Block 620).

Optionally, the delay offset can be programmatically changed based on the operating frequency or the range of operating frequency where repeatability is desired. The delay offset can also be selectively enabled and disabled if desired. For example, it may be beneficial to disable the delay offset in order to reduce signal latency.

Figure 7:
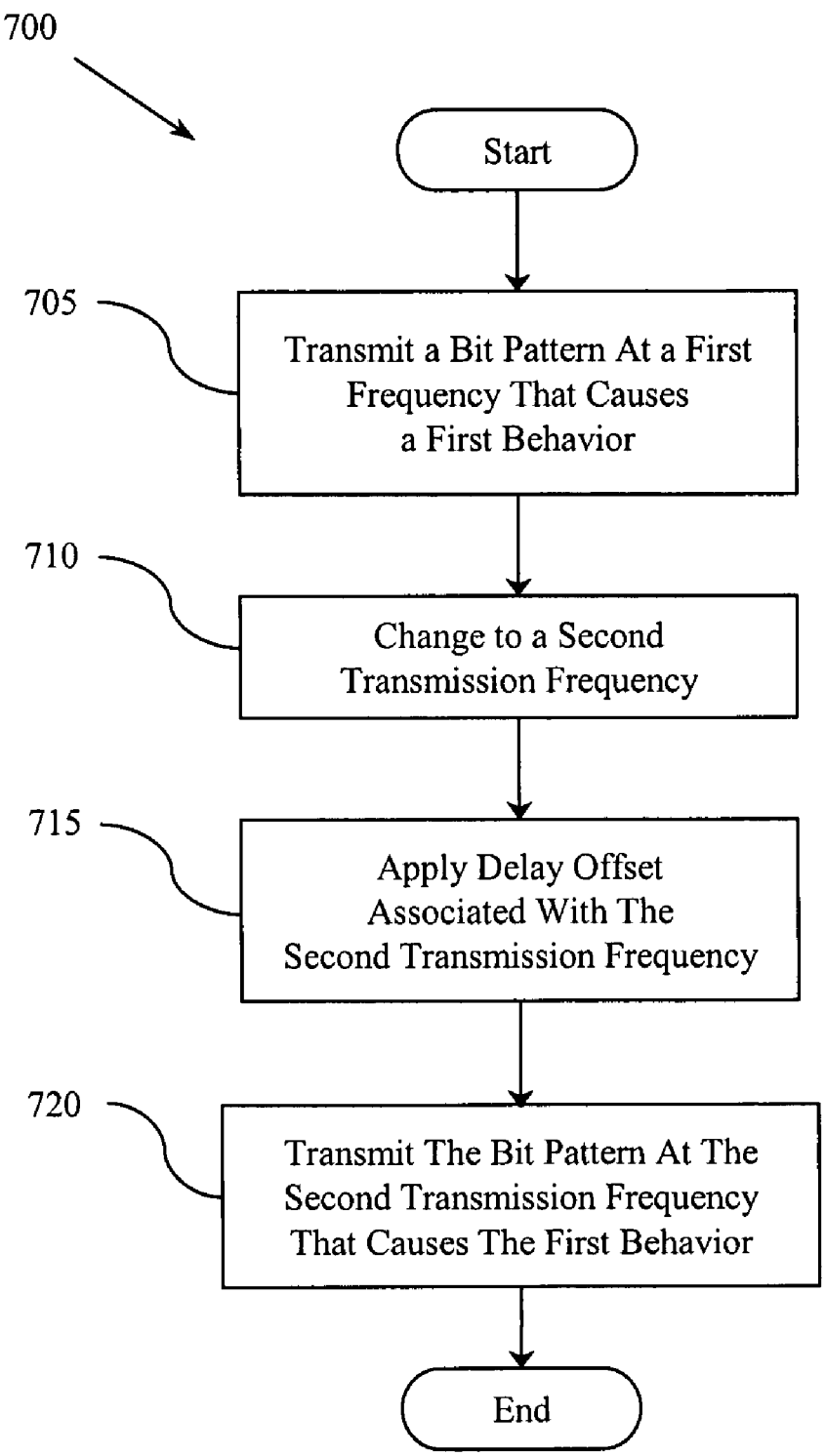
FIG. 7 illustrates an example methodology for testing a system using different operating frequencies.

Illustrated in FIG. 7 is an example methodology 700 that may be used for testing communications between two electronic components. For example, a bit pattern or test vector (e.g. stimuli) can be transmitted from a transmitting component to a receiving component at a first transmission frequency that causes a first behavior in the receiving component (Block 705). For example, the bit pattern acts as a stimulus to the receiving component. How the bit pattern is received (e.g., bits received on certain clock edges or cycles) is observed and can be compared to an expected response. Subsequently, system conditions can be changed such as changing to a different or a second transmission/operating frequency (Block 710). Rather than having to generate a new test vector or bit pattern, which can be time consuming, a delay offset can be applied that is associated with the second transmission frequency or based on the frequency range between the first and second transmission frequencies (Block 715).

The delay offset allows the same test vector or bit pattern to be transmitted (now at the second transmission frequency) that causes the first behavior to be observed in the receiving component (Block 720) and can be compared to the expected response. Internal components can be subjected to identical stimuli at different frequencies, as opposed to having the stimuli change at certain frequency points. Testing and debugging can be made easier when components behave in the same manner for a set of stimuli even when operating at wider ranges of frequencies.

Illustrated in FIG. 8 is an example computing device 800 that is configured to apply a delay offset to signals communicated between components to provide for repeatability in behavior. The computing device 800 can be, for example, a computer system, a portable computer, an image forming device with processing power, or any type of electronic device that includes signal communication between internal components. In one example, the computing device 800 can include a plurality of electronic components that may include at least a first component A 805 and a second component B 810 that are configured to communicate signals to each other over one or more point-to-point links 815. Examples of components may include, without limitation, a processor, a memory, a memory controller, other types of controllers, a chip, a circuit, or any type of logic device.

Each component A, B can include an interconnect logic 820a and 820b, respectively that are configured to control transmitting and receiving of the signals communicated over the point-to-point links 815. The interconnect logic 820a and 820b can be implemented with similar configurations and functions as described in other examples of the interconnect logics herein. A bit de-skew logic 825a and 825b can be operably connected to their corresponding interconnect logic 820a, 820b, respectively, and receive signals from each of the point-to-point links 815. The bit de-skew logic can be configured to re-align bit-to-bit skew that has been determined to occur over the links 815.

A delay offset logic 830a and 830b can be operably connected to their associated interconnect logic 820a, 820b, respectively, and are configured to selectively apply a frequency-based offset across signals received by the interconnect logic to create a total signal delay that is substantially constant for a selected transmission frequency range. The resulting signals can then be outputted to a core logic of the corresponding component for further processing. As previously described, one example of computing the total signal delay can be the time from when a signal is transmitted from component A and received by component B. Of course, the total signal delay can be computed in other ways based on a selected start and end point.

Any of the bit de-skew logics 825a, 825b and the delay offset logics 830a, 830b can be operably connected to their interconnect logic in a variety of ways. For example, one or more of the bit de-skew and/or the frequency delay logics may be internal and/or external to the interconnect logic 820a, 820b, or other desired configuration. In another example, the bit de-skew logic 825a and the delay offset logic 830a can be configured as a single component. One or more shift registers can be used to implement the bit de-skew and delay offset. Although not illustrated, logic can be included to implement a selector and selection logic as previously described. The selection logic (not shown) can be configured to control the delay offset logic 830a, or 830b, respectively to apply a selected frequency-based offset.

In one example, an amount of the frequency-based offset can be configured to increase as the signal transmission frequency increases and the link length of the point-to-point links 815 increases. In general, the amount of the frequency-based offset can be based on a transmission frequency range used for the components and a link length of the point-to-point links 815.

Optionally, the computing device 800 can be configured with a data store (not shown) that is configured to maintain one or more values for the frequency-based offset that is associated with different combinations of transmission frequency ranges and link lengths. As another example, by applying a selected delay offset, the system can cause the total signal delay to be substantially constant over different frequencies. By applying a first frequency-based offset when transmitting a test vector across the point-to-point links 815 at a first transmission frequency and by applying a second frequency-based offset when transmitting the test vector at a second transmission frequency, the same total signal delay can be achieved.

Figure 10:
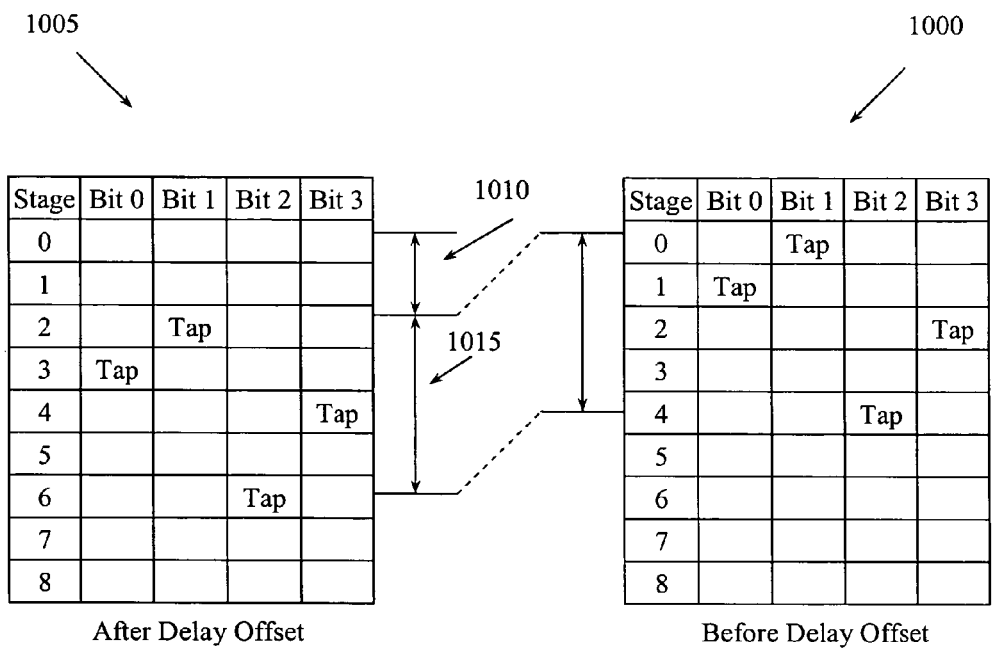
FIG. 10 illustrates an example shift register before and after a delay offset is applied.

Illustrated in FIG. 10 is an example showing two states of shift registers before and after a delay offset is applied. For example, shift register 1000 represents a before state and includes a 4-bit wide channel (bits 0-3) and is 9 bits deep (e.g., stages 0-8). One channel represents four shift registers such that each bit (e.g. 0-3) uses one shift register. Of course, different values and sizes can be used. Each bit column 0-3 represents one communication link and each column shows a selected "TAP" point that represents the location from which the bit-to-bit de-skew occurs.

At register 1005, it is shown in another state after a delay offset of two (2) bits is applied to all bits in the register 1000. The offset value of two (2) represents a repeatability delay shown as a shift 1010. The range of bit-to-bit de-skew is shown as area 1015. The maximum amount of delay offset will be limited by the depth of the register and how many shift locations (stages) are available at each end of the register. In the register 1000, at the top end, the "tap" is in Stage 0 which does not allow a delay offset to put it less than Stage 0. At the bottom end, the "tap" is in Stage 4 which allows a maximum of a four (4) bit shift for delay offset. Of course, a deeper register can be used to allow for greater values of the delay offset. Applying a delay offset like in the register 1005 can make a system repeatable over different operating frequencies. The bit skew area 1015 will vary depending on how much skew needs to be applied and as the area 1015 is made greater, the amount of stages available for repeatability offset becomes less.

With the above-described systems and methods, designing, manufacturing, testing, and/or debugging a chip or other logic device can be made easier when the chip has repeatable behavior over different operating frequencies. Applying a repeatability/delay offset can be simply implemented in existing bit-to-bit de-skew registers by making the registers deeper, or by using separate offset mechanisms such as one or more additional shift registers. In this manner, when a stimulus is applied to a chip or other logic device, it is desirable to get the same response on the same clock edges when the chip operates at different frequencies.

Figure 11:
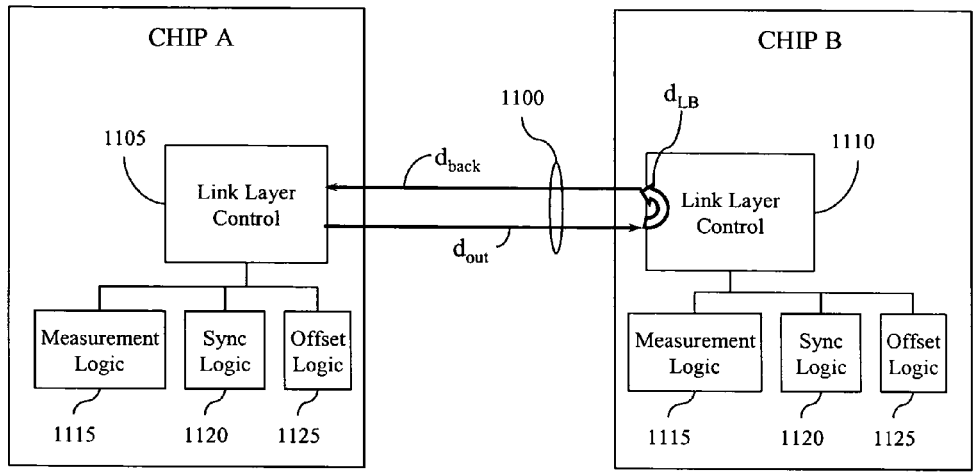
FIG. 11 illustrates an example diagram of two components in communication with each other that can synchronize link delay measurement.

With reference to FIG. 11, an example system is illustrated that is associated with link delay measurement and synchronizing link delay between two electronic components to provide determinism/repeatability in signal communications. For example, a first chip A is configured to be in signal communication with a second chip B connected by one or more serial communication links 1100. The communication links 1100 may be, for example, high speed point-to-point links. Chip A and chip B may be configured on the same printed circuit board or can be on separate boards. Each chip is configured with a link layer control 1105, 1110, respectively, that is configured to control transmission and reception of signal communications over the communication links 1100. The link layer control 1105, 1110 can be configured with any desired type of logic and may include PAD hardware as previously described (e.g. with reference to the interconnect logic 115 of FIG. 1). In general, the link layer control 1105, 1110 provides layers of abstraction and protocol for controlling signal communication.

To maintain determinism/repeatability in the system, the time delay for transmitting signals between chip A and chip B needs to be measured and synchronized so that the delay from either chip is equivalent. If the time delay resolves differently for a pair of communication links 1100, processing of signals (e.g. bits) may be skewed between the chips and may result in inaccurate data transmission.

In one example, the tap location within a bit de-skew register (as shown in FIG. 5, FIG. 10) may be assigned inaccurately based on the calculation of the link delay. To measure the link delay between chip A and chip B, a measurement logic 1115 is provided that is configured to measure a total loop delay associated with transmitting signals from chip A to chip B and back to chip A. For purposes of explanation, the total roundtrip delay will be represented as $d_{loop}$ which is formed from time components represented by:

$$d_{loop} = d_{out} + d_{back} - d_{LB}$$

where:

$d = d_{out} = d_{back} =$ uni-directional link delay (trace match)

$d_{loop} =$ total roundtrip delay $d_{LB} =$ loop-back delay

In one example, the measurement logic 1115 is configured to receive the total roundtrip delay information from a time domain reflectometer or other signal time measurement device, or may include a time domain reflectometer. For example, the time domain reflectometer can be a device or logic that can analyze a conductor (e.g. wire, cable, or fiber optic channel) by sending a pulsed signal into the conductor, and then examining the reflection of that pulse. The measurement logic 1115 can also be configured to determine the uni-directional delay of the communication link 1100. In this example, it is assumed that neither chip A nor chip B can directly measure the uni-directional delay but can measure the total roundtrip delay $d_{loop}$ and determine the uni-directional delay therefrom.

The loop-back delay $d_{LB}$ represents the time it takes for chip B to turn the signal transmission around and send it back to chip A. The loop-back delay $d_{LB}$ can be predetermined for each chip by, for example, running tests on the chip, programmatic or automatic schemes applied to the chip, or by other means. The loop-back delay $d_{LB}$ and can be stored in a memory or the like, and can then be provided to other chips so that the value can be used in calculations. Thus, the uni-directional delay $d = d_{out} = d_{back}$ can be computed by:

$$d = (d_{loop} - d_{LB})/2$$

In one example, the uni-directional delay d as well as the other values are measured in terms of numbers of clock cycles. A Unit Interval (UI) in the following examples will refer to a ½ unit of a clock cycle, or in other words, the amount of time that one atomic piece of data is on the links 1100 (e.g. on a bus). The final uni-directional delay d value is rounded to a whole integer value and can be used to determine the delay offset or repeatability offset value that can be applied to the shift register as described in previous examples. Each chip A and B takes turns in making the total roundtrip delay measurement and uni-directional delay determination.

One potential issue may occur if chip A resolves the uni-directional delay value d differently than chip B resolves the value. For example, the delay value may be close to a clock cycle boundary so that when it is rounded, chip A may round to a cycle value N while chip B may choose cycle value N+1. In this example, cycle N represents the uni-directional delay value d.

Thus, the value N represents the amount of delay in clock cycles to add to a chip to make the system repeatable. One objective is make the total delay constant for the system and to make sure that both sides of the system (e.g. chip A and chip B) determine the value N as the same value. In that regard, a synchronization logic 1120 is provided that is configured to determine the uni-directional delay for signal transmissions between chip A and chip B. Based on the determination, the synchronization logic 1120 can control an offset logic 1125 that is configured to apply a selected offset. In one example, the synchronization logic 1120, by controlling the selected offset, is configured to adjust the total loop delay to be an even value to cause the uni-directional delay to be equal from both chip A and chip B. Since the algorithm divides by two, dividing an even number by two makes the calculations easier.

By making each chip determine the same uni-directional delay value, signal communication and the link delay between the electronic components, chip A and chip B, can be synchronized to provide repeatability. As stated previously, both chips A and B take turns determining the total loop delay and whether a selected offset is needed to adjust the delay from its side. Thus, chip B also includes similar components of the measurement logic 1115, the synchronization logic 1120, and the offset logic 1125. The offset logic 1125, for example, can be configured to apply the selected offset to signal transmissions to cause the uni-directional delay between chip A and chip B to be synchronized for both directions of signal transmissions.

Figure 12:
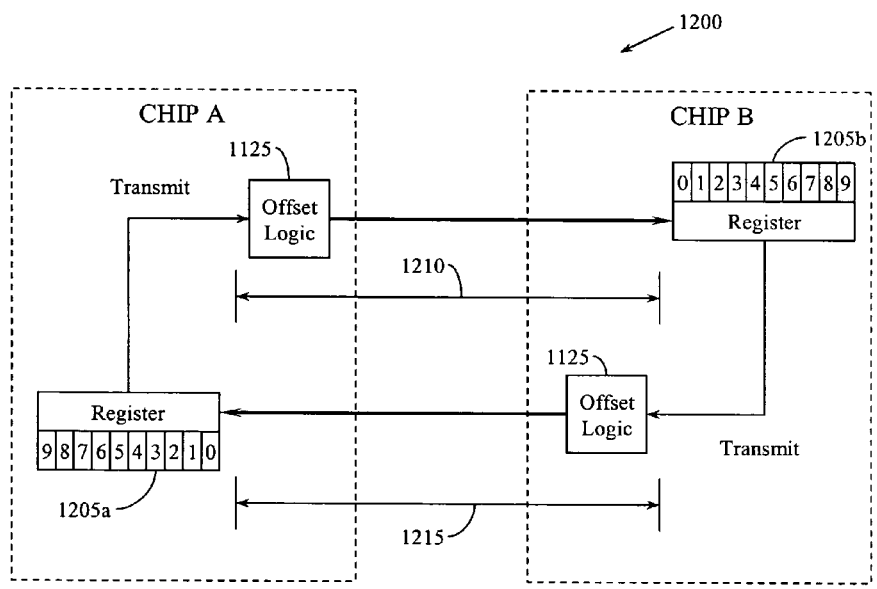
FIG. 12 illustrates an example system diagram of an offset logic operably connected to electronic components.

Illustrated in FIG. 12 is one example configuration of the offset logic 1125 operably connected to chip A and chip B. The offset logic 1125 can be connected so that a selected offset can be applied to signals being transmitted from the chip. Each chip A and B is shown with a register 1205*a* and 1205*b*, respectively, that is configured to receive bits from the communication link and/or to supply bits to be transmitted across the communication link. The registers 1205*a*, 1205*b* can be configured as shift registers that can apply a bit-to-bit de-skew and/or a delay offset as previously described. Although the registers 1205*a*, 1205*b* are shown with a depth of ten bits (e.g. 0-9), a bigger or smaller depth can be used. In another example, multiple shift registers can be used, and/or separate shift registers can be used for receiving and transmitting data.

Reference numeral 1210 represents a length of a uni-directional time that it takes for a signal to be transmitted from chip A and received by chip B. Similarly, reference numeral 1215 represents the uni-directional delay that it takes to transmit a signal from chip B until it is received by chip A. The synchronization logic 1120 and offset logic 1125 as previously described are configured to ensure that the values for time length 1210 and time length 1215 are determined as equal values. Thus, whether or not the offset logic 1125 is activated to apply a selected offset depends on what is determined as the total loop delay and how the uni-directional delay value is resolved. In the following example, the selected offset will be a ½ unit interval (UI) that may or may not be applied to the transmission side of an electronic component so that the total loop delay can be an even value.

Figure 13:
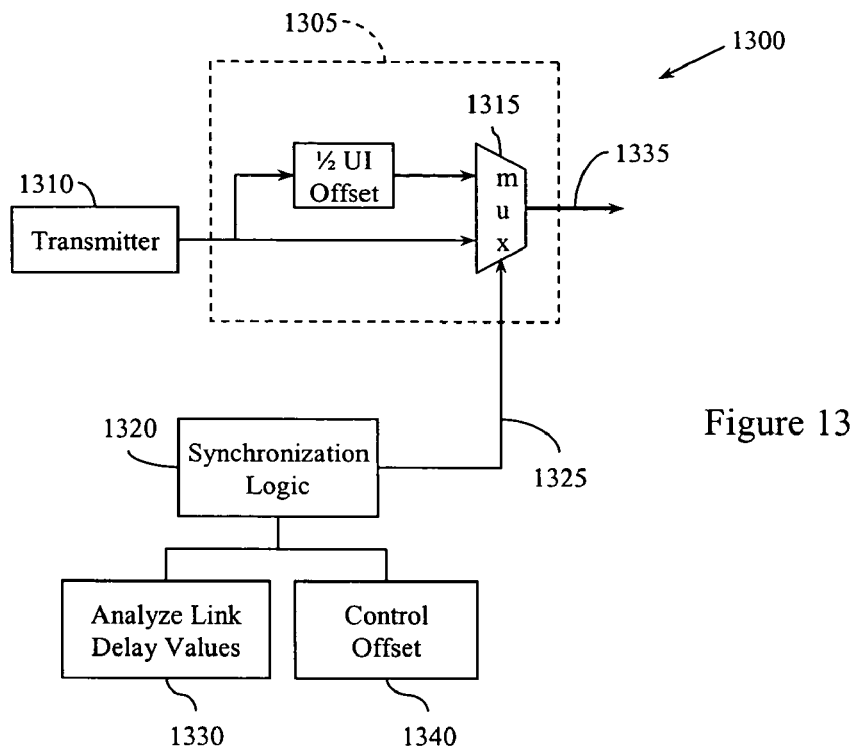
FIG. 13 illustrates an example configuration of an offset logic and synchronization logic for link delay synchronization.

With reference to FIG. 13, an example synchronization system 1300 is shown including an offset logic 1305 that is configured to selectively apply a ½ unit interval delay to signals being transmitted. The system 1300 includes a transmitter 1310 that controls transmission of signals such as PAD hardware or other interconnect logic. The transmitter 1310 can be operably connected to a multiplexer 1315 that is part of the offset logic 1305. The multiplexer 1315 can be configured to selectively apply a ½ unit interval offset if it is determined that the offset is needed to adjust the time delay so that the uni-directional delays between components can be resolved equally.

A synchronization logic 1320 may be configured to control the multiplexer 1315 by providing a control signal 1325 to apply or not apply the offset value. The synchronization logic 1320 can be similarly configured as the synchronization logic 1120 shown in FIG. 11. In one example, the synchronization logic 1320 is configured to analyze link delay values 1330 that have been obtained through measuring the signal delays across communication link(s) 1335. Based on the link delay values 1330, the synchronization logic 1320 controls the offset 1340 by determining whether to apply the selected offset and activate or deactivate the control signal 1325 to the multiplexer 1315.

In table 1 shown below, various examples of how the uni-directional delay value N can be resolved when rounded to an integer when the initial value of the uni-directional delay is close to a clock cycle boundary N. However, when the "value" is offset from N by $\pm\epsilon$ where $\epsilon$ is a small value $<< ½$ unit interval, different results can occur. The value $\epsilon$ may be determined by bit skew and trace matching.

TABLE 1

| EXAMPLE | VALUE | ROUNDS TO |
|---------|-------|-----------|
| 1 | N + $\epsilon$ | N |
| 2 | N − $\epsilon$ | N − 1 |
| 3 | N + $\epsilon$ + ½ | N |
| 4 | N − $\epsilon$ + ½ | N |

Table 1 shows four examples using an algorithm that rounds the "value" down. N represents a time delay that is on a clock boundary. An undesirable result occurs in the case where the initial value is N+ε, which would round down to a value N (e.g. example 1) but when the initial value is N−ε, the value rounds down to N−1 (e.g. example 2). To address this resolution discrepancy, the synchronization logic 1320 can be configured to apply the ½ unit interval to the initial values as shown in examples 3 and 4 in Table 1. Then in both cases, the values both round to the same N value.

The synchronization logic 1320 can include an algorithm that picks which side of the system (e.g. chip A or chip B) to add the ½ unit interval delay if there is an odd loop time and to move the initial value away from a clock cycle boundary. In this manner, the synchronization logic 1320 can be configured to adjust the total loop delay to be an even value by applying the selected offset to cause the uni-directional delay from both chip A and chip B to be an equal value no matter which chip makes the calculation.

Figure 14:
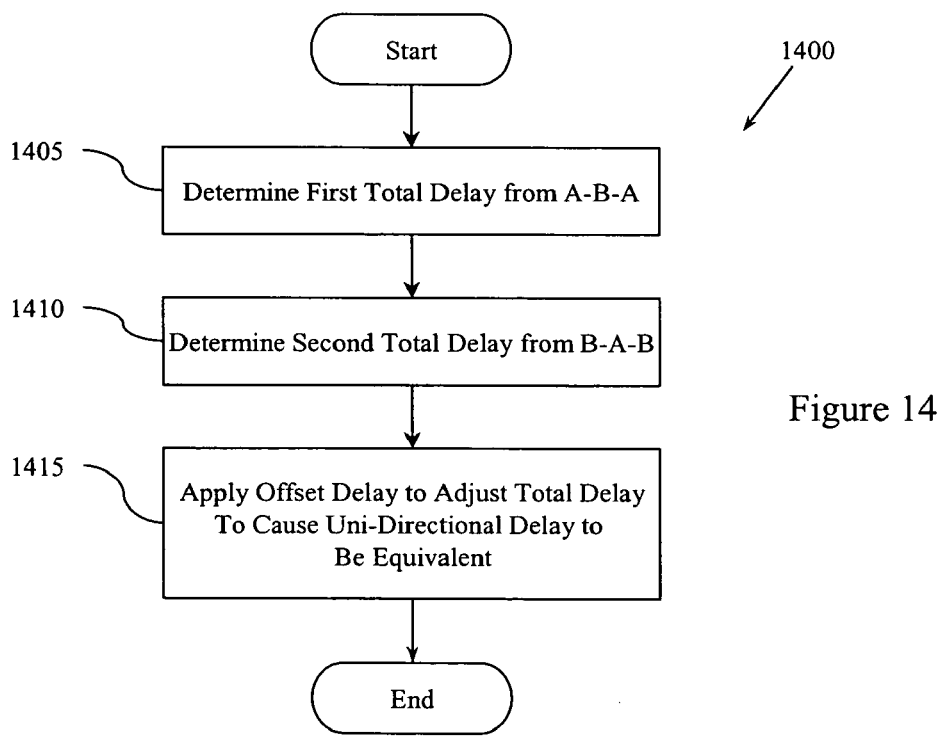
FIG. 14 illustrates an example methodology for synchronizing link delay.

Illustrated in FIG. 14 is one example of a methodology 1400 associated with synchronizing the link delay between two electronic components that are in communication by one or more serial links. For purposes of explanation, the two electronic components will be referred to as component A and component B. The method can begin by determining a first total delay (Block 1405) that is associated with a roundtrip transmission of signals from component A to component B and back to component A. A second total delay can then be determined (Block 1410) associated with a roundtrip transmission of signals from component B to the component A and back to component B. An offset delay can be applied to adjust at least one of the first total delay and the second total delay to cause a uni-directional delay between component A and component B to be equivalent based on either the first total delay and the second total delay (Block 1415). In other words, the uni-directional delay that is determined is adjusted to be the same whether signals are transmitted from component A or whether they are transmitted from component B.

In other examples of the methodology 1400, the offset delay can be a rounding offset that is selectively applied to cause the first total delay and the second total delay to be rounded to an equivalent even value. As described in previous examples, the first and second total delays can be measured by unit intervals where one unit interval represents a ½ clock cycle and where the applying step (Block 1415) selectively applies the rounding offset as a ½ unit interval. As also explained previously, the first total delay can be determined to include a uni-directional delay from component A to component B, a uni-directional delay from component B to component A and a loop-back delay being a delay for returning the signals within the component B. Likewise, the second total delay can be formed with the same delay components except that the time delay components are computed/measured from component B as being the transmitting component. Once an equivalent value for the uni-directional delay value N is determined, the method can use the N value to apply a delay offset to the signals to compensate for frequency changes in signal transmissions over the one or more communication links where the delay offset is based on the uni-directional delay.

Figure 15:
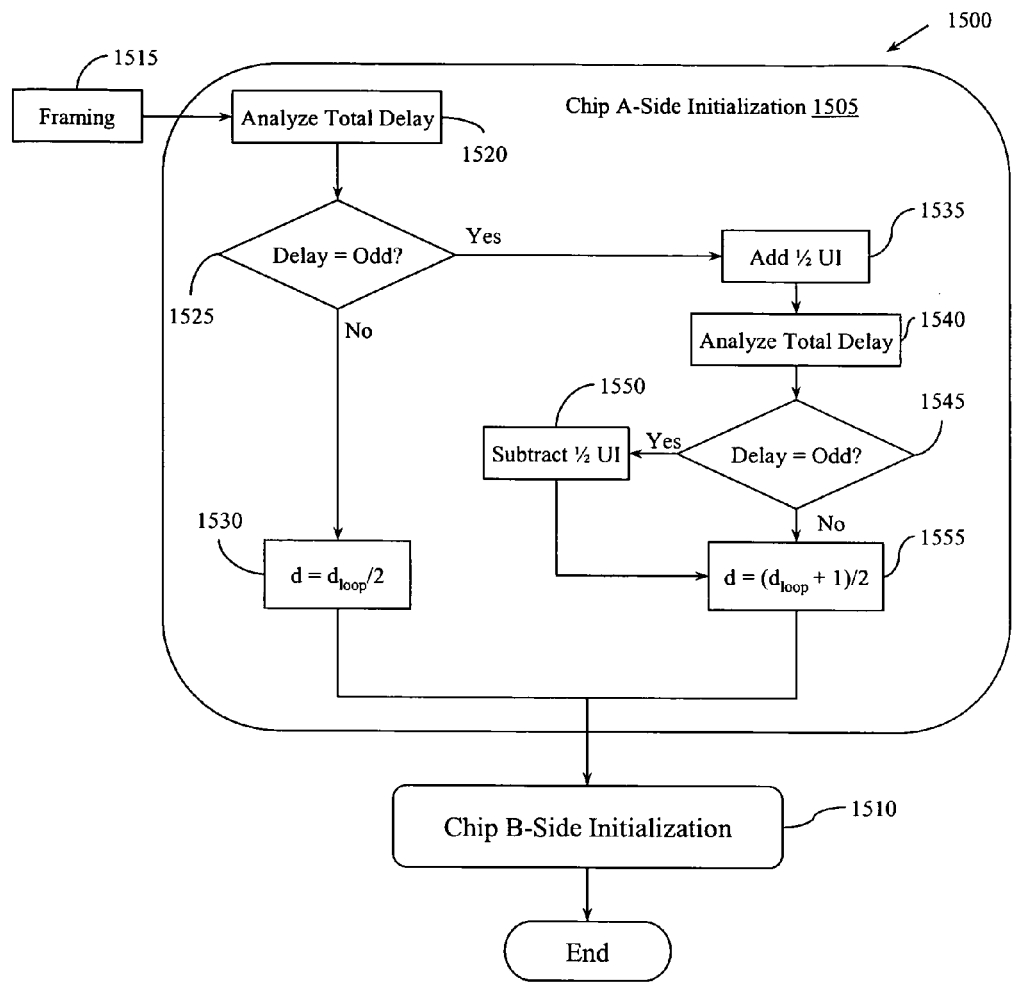
FIG. 15 illustrates another example methodology for synchronizing link delay.

Illustrated in FIG. 15 is another example methodology 1500 associated with determining and synchronizing the time delay d for two electronic components (e.g. chip A and chip B) that are connected to each other over serial links. The value d is used as the value N described above. The method 1500 is shown with two stages where each chip is initialized to determine the delay. The stages include a chip A-side initialization 1505 and a chip B-side initialization 1510 which includes the same steps as in the chip A initialization and, thus, is not shown in detail.

The initialization 1505 may include signal framing (Block 1515) and transmission of signals from chip A to chip B so that a total round trip loop delay can be measured. The total loop delay is then analyzed (Block 1520). If the total delay $d_{loop}$ is not an odd value at decision Block 1525, the delay d is determined as d=the total loop delay $d_{loop} \div 2$ (Block 1530) and the process goes to the chip B side initialization 1510.

However, if the total delay is an odd value at decision Block 1525, a ½ unit interval is added (Block 1535) and the total delay is analyzed again (Block 1540). If the delay is still an odd value at decision Block 1545, the ½ unit interval is subtracted (Block 1550) and the uni-directional delay d is determined by adding one (1) unit value to the total loop delay $d_{loop}$ so that it becomes an even value and then it is divided by two (Block 1555). Overall, the total roundtrip delay $d_{loop}$ is made to be an even value so that when it is divided by two, the delay will be computed as the same equal value whether it's from the chip A-side or the chip B-side.

In Table 2 below, a few examples and steps of determining the delay value d in a few different scenarios are shown where chip A initializes first and where chip B initializes first. The steps follow FIG. 15.

TABLE 2

Case When Side A Initializes First

Side A Init

Figure 16:
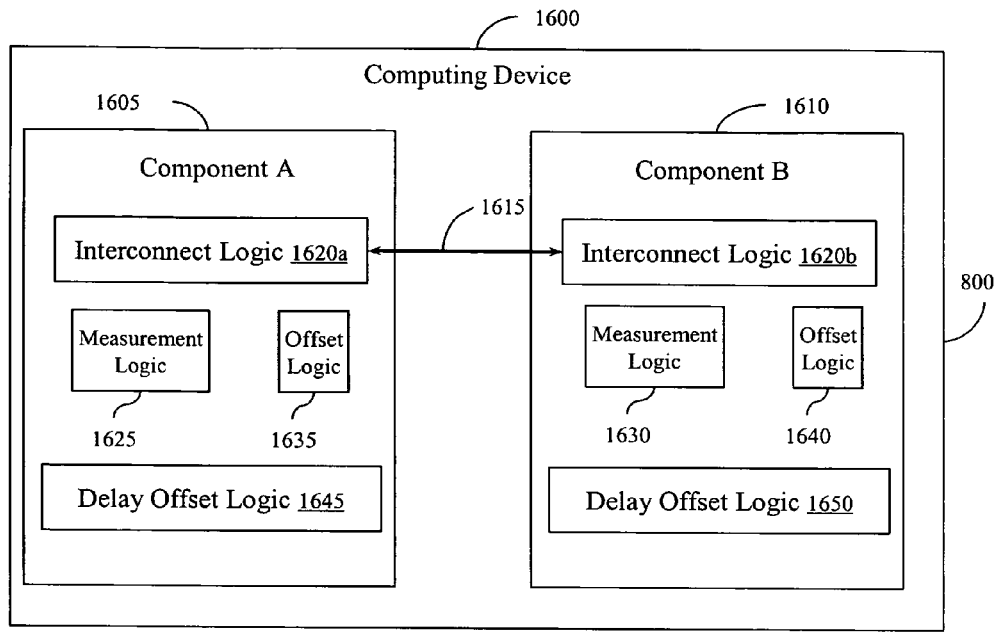
FIG. 16 illustrates one example of a computing device configured to synchronize link delay measurement.

1. Analyze $d_{loop}$ = N + N − 1 = 2N − 1
2. If $d_{loop}$ is ODD, add ½ UI to transmission side A
3. Analyze $d_{loop}$ = N + N − 1 = 2N − 1 again
4. If $d_{loop}$ is still ODD, subtract ½ UI from driver A
5. Use N for delay value d Side B Init 1. Analyze $d_{loop}$ = N − 1 + N = 2N − 1
2. If $d_{loop}$ is ODD, add ½ UI to transmission side B
3. Analyze $d_{loop}$ = N + N = 2N again
4. If $d_{loop}$ is EVEN, use N for delay value d Case When Side B Initializes First Side B Init 1. Analyze $d_{loop}$ = N − 1 + N = 2N − 1
2. If $d_{loop}$ is ODD, add ½ UI to transmission side B
3. Analyze $d_{loop}$ = N + N = 2N again
4. If $d_{loop}$ is EVEN, use N for delay value d Side A Init 1. Analyze $d_{loop}$ = N + N = 2N
2. If $d_{loop}$ is EVEN, use N for delay value d Illustrated in FIG. 16 is an example computing device 1600 that is configured to measure and synchronize link delay for signals communicated between electronic components to provide for repeatability in behavior. The computing device 1600 can be, for example, a computer system, a portable computer, an image forming device, or any type of electronic device that includes signal communication between internal components. In one example, the computing device 1600 can include a plurality of electronic components that may include at least a first component A 1605 and a second component B 1610 that are configured to communicate signals to each other over one or more point-to-point links 1615. Examples of components may include, without limitation, a processor, a memory, a memory controller, other types of controllers, a chip, a circuit, or any type of logic device. Each component A, B can include an interconnect logic 1620A and 1620B, respectively, that are configured to control transmitting and receiving of signals communicated over the point-to-point links 1615. The interconnect logic 1620A and 1620B can be implemented with similar configurations and functions as described in other examples of the interconnect logics herein.

A first measurement logic 1625 can be operably connected to the interconnect logic 1620A and be configured to determine a first total delay associated with a roundtrip transmission of signals from the first component A to the second component B and back to the component A. A second measurement logic 1630 can be operably connected to the interconnect logic 1620B and be configured to determine a second total delay associated with a roundtrip transmission of signals from the second component B to the first component A and back to the component B. Each component A and B can include an offset logic 1635 and 1640, respectively, that are configured to apply an offset delay to the signals communicated to adjust at least one of the first total delay and the second total delay to cause a uni-directional delay between component A and component B to be equivalent. The offset logic 1635 and 1640 can selectively apply the offset delay so that the uni-directional delay is synchronized to become the same value whether it is determined from the first total delay (e.g. computed from component A) or based on the second total delay (e.g. computed from component B).

The computing device 1600 may also include within each component A and component B, a delay offset logic 1645 and 1650, respectively, that can be configured similarly as previously described delay offset logics. In one example, the delay offset logic 1645 and 1650 are operably connected to the interconnect logic 1620A, 1620B, respectively, and are configured to selectively apply a frequency-based offset to signals received by the interconnect logic to create a total signal delay that is substantially constant for a selected transmission frequency range. The frequency-based offset can be determined from the uni-directional delay determined by each component A and B.

Although not illustrated, the offset logic 1635 and 1640 can include a multiplexer that is configured to selectively apply the offset delay. As in previous examples, the offset delay can be configured as a ½ clock unit delay that is used to selectively round at least one of the first total delay (computed by component A) and the second total delay (computed by component B) to be an even value.

Figure 17:
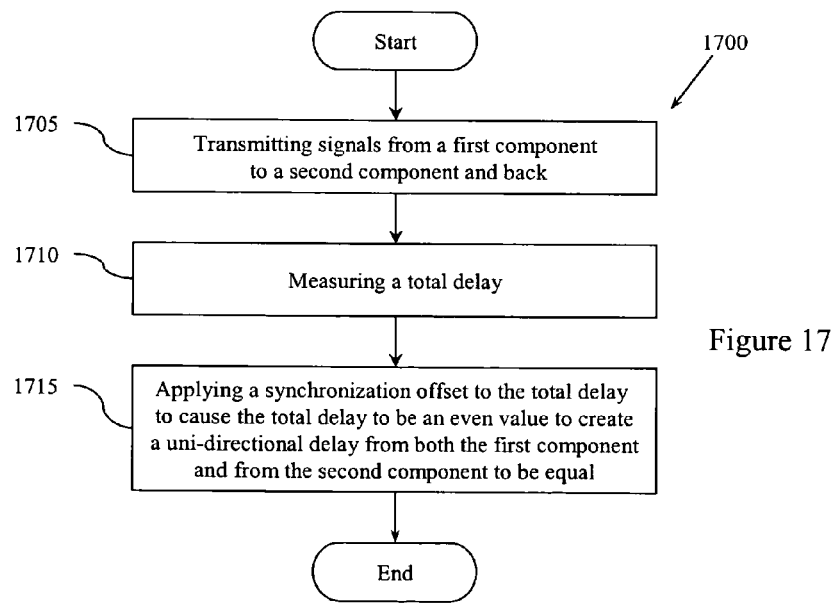
FIG. 17 is another example of a methodology associated with synchronizing link delay between two electronic components.

Illustrated in FIG. 17 is another example of a methodology 1700 associated with synchronizing the link delay between two electronic components that are in communication by one or more serial links. For purposes of explanation, the two electronic components will be referred to as a first component and a second component. The method can begin transmitting signals from the first component to the second component and back to the first component (Block 1705). A total delay is measured from when the signals are transmitted from the first component to when the signals are returned to the first component (Block 1710). A synchronization offset can be applied to the total delay to cause the total delay to be an even value to create a uni-directional delay from both the first component and from the second component to be equal (Block 1715).

The methodology 1700 can also include determining the uni-directional delay by subtracting a loop back delay from the total delay. The loop back delay, as explained in previous examples, is a delay associated within the second component for returning the signals received. The total delay is divided by two, which gives the uni-directional delay. The methodology 1700 can also be repeated but using the second component as a starting point. For example, signals can be transmitted from the second component to the first component and back to the second component. The remaining steps can then be performed to determine the total delay and the synchronization offset.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system for synchronizing signal communication between a first electronic component and a second electronic component connected by one or more serial communication links, the system comprising:
    an offset logic connected to each of the first and second electronic components and configured to apply a selected offset to signal transmissions to cause a unidirectional delay between the first and the second electronic components to be synchronized for both directions of signal transmissions; and
    a synchronization logic configured to determine the uni-directional delay for signal transmissions between the first and second electronic components and configured to control the offset logic to apply the selected offset.

2. The system of claim 1 further including a measurement logic configured to measure a total loop delay associated with transmitting signals from the first electronic component to the second electronic component and back; and
    where the synchronization logic determines the uni-directional delay using the total loop delay.

3. The system of claim 2 where the synchronization logic is configured to adjust the total loop delay to be an even value to cause the uni-directional delay to be equal from both the first electronic component and the second electronic component.

4. The system of claim 3 where synchronization logic is configured to adjust the total loop delay by:
    adding a ½ unit interval to the total loop delay if the total loop delay is odd; and
    if the total delay is odd after adding the ½ unit interval, subtracting the ½ unit interval, and adding one unit interval to the total loop delay.

5. The system of claim 2 where the measurement logic is configured to receive the total loop delay from a time domain reflectometer.

6. The system of claim 1 where the synchronization logic is configured to control the offset logic to apply the selected offset to cause a total loop delay for signal transmissions to be an even value.

7. The system of claim 1 where the one or more serial communication links comprise one or more point-to-point links.

8. The system of claim 1 where the offset logic includes a separate offset logic operably connected to each of the first electronic component and the second electronic component.

9. The system of claim 1 further including a repeatability logic configured to apply a delay offset to signal transmissions based an the unidirectional delay that is synchronized for both directions of signal transmissions.

10. A method of synchronizing link delay between two electronic components in communication by one or more serial links, the method comprising:
determining a first total delay associated with a round trip transmission of signals from a first electronic component to a second electronic component and back;
determining a second total delay associated with a round trip transmission of signals from the second electronic component to the first electronic component and back; and
applying an offset delay to adjust at least one of the first total delay and the second total delay to cause a uni-directional delay between the first and second electronic components to be equivalent based on either the first total delay and the second total delay.

11. The method of claim 10 where the offset delay is a rounding offset being selectively applied to cause the first total delay and the second total delay to be rounded to an equivalent even value.

12. The method of claim 11 where:
the first and second total delay is measured by unit intervals where one unit interval represents a ½ clock cycle; and
where the applying step selectively applies the rounding offset as a ½ unit interval.

13. The method of claim 10 further including repeating the method based on transmitting the signals from the second component to the first component and back to the second component.

14. The method of claim 10 where the first total delay includes at least a first uni-directional delay being from the first electronic component to the second electronic component, and a second uni-directional delay being from the second electronic component to the first electronic component, and a loop back delay being a delay for returning the signals within the second electronic component.

15. The method of claim 10 further including applying a delay offset to the signals to compensate for frequency changes in signal transmissions over the one or more serial links where the delay offset is determined based on the uni-directional delay.

16. A computing device comprising:
a plurality of electronic components including at least a first component and a second component that are configured to communicate signals to each other over point-to-point links;
an interconnect logic configured within both the first component and the second component, the interconnect logic being configured to control transmitting and receiving of the signals communicated over the point-to-point links;
a first measurement logic configured to determine a first total delay associated with a round trip transmission of signals from the first component to the second component and back;
a second measurement logic configured to determine a second total delay associated with a round trip transmission of signals from the second component to the first component and back; and
an offset logic configure to apply an offset delay to the signals communicated to adjust at least one of the first total delay and the second total delay to cause a uni-directional delay between the first and second components to be equivalent based on either the first total delay and the second total delay.

17. The computing device of claim 16 further including a delay offset logic operably connected to the interconnect logic and being configured to selectively apply a frequency-based offset across signals received by the interconnect logic to create a total signal delay that is substantially constant for a selected transmission frequency range.

18. The computing device of claim 17 where the delay offset logic uses the uni-directional delay to determine the frequency-based offset.

19. The computing device of claim 16 where the offset logic includes a separate offset logic configured within both the first and second component.

20. The computing device of claim 16 where the offset logic includes a multiplexer configured to selectively apply the offset delay.

21. The computing device of claim 18 where the offset delay being configured as a ½ clock unit delay used to selectively round at least one of the first total delay and the second total delay to be an even value.

22. A method comprising:
transmitting signals from a first component to a second component and back to the first component;
measuring a total delay from when the signals are transmitted from the first component to when the signals are returned to the first component; and
applying a synchronization offset to the total delay to cause the total delay to be an even value to create a uni-directional delay from both the first component and from the second component to be equal.

23. The method of claim 22 further including determining the uni-directional delay by subtracting a loop back delay from the total delay, the loop back delay being a delay associated within the second component for returning the signals received, and then dividing by two.

24. The method of claim 22 where the transmitting signals includes transmitting the signals from the first component over at least one point-to-point link to a second component and back to the first component over the at least one point-to-point link; and
the method is repeated by transmitting signals from the second component to the first component and back to the second component.

25. A system for synchronizing signal communication between a first electronic component and a second electronic component connected by one or more serial communication links, the system comprising:
an offset means for applying a selected offset to signal transmissions to cause a unidirectional delay between the first and the second electronic components to be synchronized for both directions of signal transmissions; and a synchronization means for determining the uni-directional delay for signal transmissions between the first and second electronic components and for controlling the offset means to apply the selected offset.

26. The system of claim 25 whew the synchronization means is configured to adjust a total loop delay of the signal transmissions to be an even value to cause the uni-directional delay to be equal from both the first electronic component and the second electronic component.

* * * * *

UNITED STATES PATENT AND TRADEMARK OFFICE
CERTIFICATE OF CORRECTION

PATENT NO. : 7,533,285 B2  
APPLICATION NO. : 10/830375  
DATED : May 12, 2009  
INVENTOR(S) : Samuel D. Naffziger et al.

Page 1 of 1

It is certified that error appears in the above-identified patent and that said Letters Patent is hereby corrected as shown below:

In column 19, line 16, in Claim 9, after "based" delete "an" and insert -- on --, therefor.

In column 20, line 34, in Claim 21, delete "claim 18" and insert -- claim 16 --, therefor.

In column 22, line 1, in Claim 26, delete "whew" and insert -- where --, therefor.

Signed and Sealed this

Fifteenth Day of September, 2009

David J. Kappos
*Director of the United States Patent and Trademark Office*